United States Patent
Madjlessi (10) Patent No.: US 8,060,735 B2
(45) Date of Patent: Nov. 15, 2011

(54) PORTABLE DEVICE AND METHOD FOR EXTERNALLY GENERALIZED STARTING UP OF A COMPUTER SYSTEM

(76) Inventor: Afchine Madjlessi, Moulen de Pa Tour (FR)

(*) Notice: Subject to any disclaimer, the term of this patent is extended or adjusted under 35 U.S.C. 154(b) by 467 days.

(21) Appl. No.: 12/384,904

(22) Filed: Apr. 9, 2009

(65) Prior Publication Data
US 2009/0276618 A1    Nov. 5, 2009

(30) Foreign Application Priority Data
Apr. 14, 2008   (FR) .................................... 08 02037

(51) Int. Cl.
G06F 9/00 (2006.01)
H04L 9/32 (2006.01)
(52) U.S. Cl. .................................. 713/1; 713/2; 713/100
(58) Field of Classification Search .................. 713/1, 2, 713/100
See application file for complete search history.

(56) References Cited

U.S. PATENT DOCUMENTS

| | | | | |
|---|---|---|---|---|
| 5,448,045 A * | 9/1995 | Clark | ............ | 235/382 |
| 5,892,902 A | 4/1999 | Clark | | |
| 6,654,797 B1 * | 11/2003 | Kamper | ............ | 709/220 |
| 2005/0055566 A1 | 3/2005 | Huang | | |
| 2008/0040595 A1 * | 2/2008 | Kasuga | ............ | 713/2 |
| 2008/0082813 A1 * | 4/2008 | Chow et al. | ............ | 713/2 |
| 2009/0013165 A1 * | 1/2009 | Chow et al. | ............ | 713/2 |
| 2009/0265536 A1 * | 10/2009 | Filee et al. | ............ | 713/1 |
| 2010/0017863 A1 * | 1/2010 | Chung et al. | ............ | 726/7 |

FOREIGN PATENT DOCUMENTS
FR    08 00076    1/2008

OTHER PUBLICATIONS

Filee, Alain, and Martin, Rene. Device, Systems, and Method for Securely Starting Up a Computer Installation. Jan. 7, 2009, U.S. Appl. No. 12/319,444. This Document Is Not Yet Published.
French Search Report for 08 02037.

* cited by examiner

Primary Examiner — M Elamin
(74) Attorney, Agent, or Firm — Russell W. Guenthner (57) ABSTRACT

An improved portable device for start-up of a computer system is disclosed. This portable device for externally starting up a computer system comprises a connection interface to the computer system and a data medium comprising data and executable codes of a host operating system that can be activated by a start-up program of the computer system and configured to automatically detect hardware and/or software elements of the computer system and to activate the corresponding computer drivers. The data medium further comprises data and executable codes of a management software interface, configured to present the computer drivers activated by the host operating system in the form of at least one predetermined generic computer driver, and data and executable codes of a guest operating system that can be activated by the management software interface and configured to manage the hardware and/or software elements on the computer system using the predetermined generic computer driver.

10 Claims, 5 Drawing Sheets

PORTABLE DEVICE AND METHOD FOR EXTERNALLY GENERALIZED STARTING UP OF A COMPUTER SYSTEM

CROSS REFERENCE TO RELATED APPLICATIONS

This application Claims priority under 35 U.S.C. Section 119 to:
Application Number: 02037
Country: FR
Holder: Bull SAS
Title: Dispositif portable et procédé de demarrage exteme d'une installation informatique
Filing date: Apr. 14, 2008
Inventor: MADJLESSI, Afchine
and which is hereby incorporated by reference.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

A computer system generally comprises at least one internal hard disk and a motherboard fitted with a microprocessor and RAM (Random Access Memory) for the purpose of executing computer programs stored on the hard disk. The microprocessor is typically suitable to execute a start-up program of the computer system, the start-up program typically comprising the instruction statements to run an operating system. The computer system's internal hard disk stores such a start-up program and which is typically associated with a predetermined operating system.

A start-up program and a predetermined operating system may also be available on an external data medium, such as a CD-ROM (Compact Disk Read Only Memory) provided with the computer system when it is fitted with a corresponding drive, or via another type of medium that can be connected to the computer system, via a USB (Universal Serial Bus) port for example.

An initial start-up strategy applied by the microprocessor can also be defined in a Basic Input/Output System, commonly called a BIOS, which resides in a read-only memory (ROM) on the motherboard. The BIOS can establish a hierarchy for the choice of a start-up, giving, for example, priority to the CD-ROM start-up program, if it is properly positioned in the computer system's drive and if its start-up program is ready to be executed, then to the start-up program on another medium, if it is connected to a USB port on the computer system and if its start-up program is ready to be executed, and then by default to the start-up program on the internal hard disk.

Moreover, even if the start-up strategy applied by the microprocessor places a priority on executing the start-up program of the internal hard disk of the computer system, it typically can be configured through the BIOS, or in other selectable ways such as by switches, to activate an operating system stored on an external device, for example a portable device connected to the USB port of the computer system.

Booting a computer system from a portable device can provide advantages for computer users in that a computer user can walk up to a computer with his or her own working environment carried in their pocket including for example the user's data, the user's programs, the user's operating system, the user's environmental parameters, or other data and/or code of use by the holder of the portable device. The computer can then potentially be booted and can present to the user the environment desired.

Relative to the problem of providing a portable device for carrying out such a booting operation, reference is made to the pending U.S. patent application of FILEE, Alain, and MARTIN, Rene. Entitled "DEVICE, SYSTEMS, AND METHOD FOR SECURELY STARTING UP A COMPUTER INSTALLATION" filed on Jan. 7, 2009, and assigned to the same assignee as named herein. This application is on file in the United States Patent and Trademark Office as patent application Ser. No. 12/319,444, still pending and which document, in its entirety, is hereby incorporated by reference.

This application discloses a device for secured startup of a computer installation that includes means for securing use of data and executable codes from the device to the computer installation. However, the patent application does not address the problems described herein of accommodating variations in the environments or operating systems of computer systems.

Hardware elements of a computer system are not however standardized and may vary widely from one computer to another, even computer systems used within the same company. For example, a Personal Computer may be required to support attachment of hardware and/or software elements from hundreds or even thousands of manufacturers. Interface to this hardware is typically provided to an operating system or other program through "low level" programs called "drivers". These hardware and software specific driver programs are typically written by the manufacturers of the computer hardware or software elements.

The need for driver programs by an operating system is not easily anticipated because of the large number and types of hardware and software elements which might need to be supported. Also, even on a specific computer system, the list of attached hardware components may change from day to day, or even more frequently. Detecting the attached hardware components of a specific computer system also takes time. Keeping within the operating system, a known list of attached hardware components may decrease the time to boot a machine because time is not needed to "detect" all of the attached hardware components. For these reasons, some popular operating systems have "installed" as a part of the operating system only those drivers currently needed by the operating system, or only the most commonly used drivers.

This presents a potential problem in booting any selected computer system from a single portable device with a user's desired "guest" operating system. If the guest operating system does not include all the drivers necessary to support the selected computer system's currently attached hardware, and/or if the guest operating system does not provide for automatic installation of drivers for any attached hardware, then it may be difficult or impossible to complete the booting of the selected computer with the desired guest operating system and desired user environment, and also with support for the attached hardware.

BRIEF SUMMARY OF THE INVENTION

It would therefore be desirable to provide a more general approach which provides support for attached hardware and software components/elements which differ from one computer system to another, and which further provides for booting from a portable device even when the user desires using an operating system that does not necessarily provide direct support (e.g. with specific drivers) for the hardware or software components currently attached to the selected computer system.

The present invention according to an illustrated embodiment broadly relates to a portable (transportable) device for externally starting up a computer system. It also broadly relates to a method for starting up on a general computer system from a user's operating system, software, programs and/or drivers stored on a user's external transportable or portable device.

According to the illustrated embodiment of the present invention, the invention is directed to a portable device for externally starting up a computer system, comprising:
    a connection interface for operatively coupling the device to the computer system, and
    a portable device data medium comprising data and executable codes of a host operating system that can be activated by a start-up program of the computer system and configured to automatically detect hardware and/or software elements/components of the computer system and to activate computer drivers corresponding to the detected components.

The advantage of such a portable start-up device for externally starting-up of the illustrated embodiment is that it allows a user to start up a computer system based on an operating system and possibly an environment that are specific to this user so that it is not dependent on the operating system and environment that is pre-installed on the computer system, while also being capable of adapting his or her operating system and environment to the hardware and/or software elements of the computer system. To account for the fact that the user may not know beforehand what hardware, software, or operating system components the computer system possesses, the host operating system stored by the portable external start-up device of the illustrated embodiment is set up to provide the capability to automatically detect the hardware and/or software elements of the computer system and to activate the appropriate computer drivers.

The invention overcomes constraints that may limit the possible choice of host operating systems being able to be stored by the portable external start-up device: That is, although most operating systems can use the hardware and/or software elements using predetermined and/or limited generic computer drivers, they are not necessarily designed or configured to automatically detect the hardware and/or software elements of the computer system on which they are run and to activate on demand the corresponding specific computer drivers. That is, some operating systems rely on at least some hardware or software specific drivers to have been previously installed on the computer system and made accessible to that operating system.

In the prior art, if the user wishes to be able to freely choose the host operating system having to be stored on the portable external start-up device, to enable it to work with an operating system and possibly environment of his choice, it is not possible, in every possible external start-up, to guarantee that the hardware and/or software elements of the computer system will be automatically detected and that the relevant drivers will be activated.

This constraint thus complicates the start-up of the computer system from a portable external start-up device.

Moreover, some operating systems cannot even be executed by a start-up program of the computer system at start-up if they are stored on a portable device that is external to the system.

Therefore, it becomes desirable to provide a portable device and/or a method for starting up a computer system that can overcome at least one aspect of these constraints.

This is accomplished by an illustrated embodiment of the present invention through the use of a portable device for externally starting up a computer system, comprising:
    a connection interface to the computer system,
    a data medium comprising data and executable codes of a host operating system that can be activated by a start-up program of the computer system and configured to automatically detect hardware and/or software elements of the computer system and to activate corresponding computer drivers,
the data medium further comprises:
    data and executable codes of a management software interface configured to present the computer drivers that are activated by the host operating system in the form of at least one predetermined generic computer driver,
and,
    data and executable codes of a guest operating system that can be activated by the management software interface and configured to manage the hardware and/or software elements of the computer system using the predetermined generic computer driver.

Hence, by constructing the portable external start-up device according to the teachings of the present invention, it is possible for the host operating system to automatically adjust to the computer system, regardless of its hardware and/or software elements, and provide a wide choice of operating systems and possible environments specific to the user through the use of the management software interface, which allows the user to freely select a guest operating system to be added by the portable external start-up device of the illustrated embodiment.

Note that the teachings of the present invention make it possible to choose a guest operating system that is not being able to be executed at start-up from a portable external device, because it is the host operating system that is executed at start-up by the start-up program of the computer system and not the guest operating system directly.

Optionally, the data medium of the portable external start-up device of the illustrated embodiment comprises data and executable codes of the start-up program of the computer system.

Optionally, the connection interface of the illustrated embodiment may comprise a USB port.

Optionally, a portable device according to the teachings of the invention comprises means for securing use of the data and executable codes and means for transmitting the data and executable codes from the data medium to the computer system via the connection interface, after executing the security means, to start up the computer system using the transmitted data and executable codes.

Optionally, the security means include means for verifying and validating access rights, for executing an authentication method of a user of the device.

Optionally, the security means comprise cryptographic means for securing data and executable codes stored in the data medium.

Optionally, the cryptographic security means comprise means for executing a method for verifying the integrity of the data and executable codes stored in the data medium.

Optionally, the cryptographic security means comprise means for executing a method for decrypting data and executable codes stored in the data medium.

The present invention is also directed to a method for starting up a computer system using a portable external start-up device, in which the method comprises the following steps:

connecting a portable external start-up device to the computer system, executing a start-up program of the computer system, activating a first operating system by the start-up program of the computer system to automatically detect hardware and/or software elements of the computer system and to activate corresponding computer drivers, the method further comprises the following steps:

activating a management software interface configured to present the computer drivers activated by the first operating system in the form of at least one predetermined generic computer driver, and activating, by the management software interface, a second operating system, stored in the form of data and executable codes by the portable external start-up device for managing hardware and/or software elements of the computer system using the predetermined generic computer driver.

Optionally, a start-up method according to the invention further comprises a step for securing use of the data and executable codes stored in the data medium of the portable external start-up device and, after the security step has been executed, the portable external start-up device performs a further step of transmitting the data and executable codes stored in the data medium to the computer system in order to activate the second operating system.

It is noted that certain elements of the present invention could be implemented as either hardware, software or firmware components, and that description of any specific implementation does not imply that a specific or limiting approach is implied. The description is exemplary in describing one or more preferred embodiment, and alternatives could be determined or designed by one skilled in the art.

BRIEF DESCRIPTION OF THE SEVERAL VIEWS OF THE DRAWING

In accordance with the teachings of the present invention an illustrated embodiment of the invention may include The invention will be better understood by means of following description, given only as an example and in reference to the attached drawings, wherein.

DETAILED DESCRIPTION OF THE INVENTION

Figure 1:
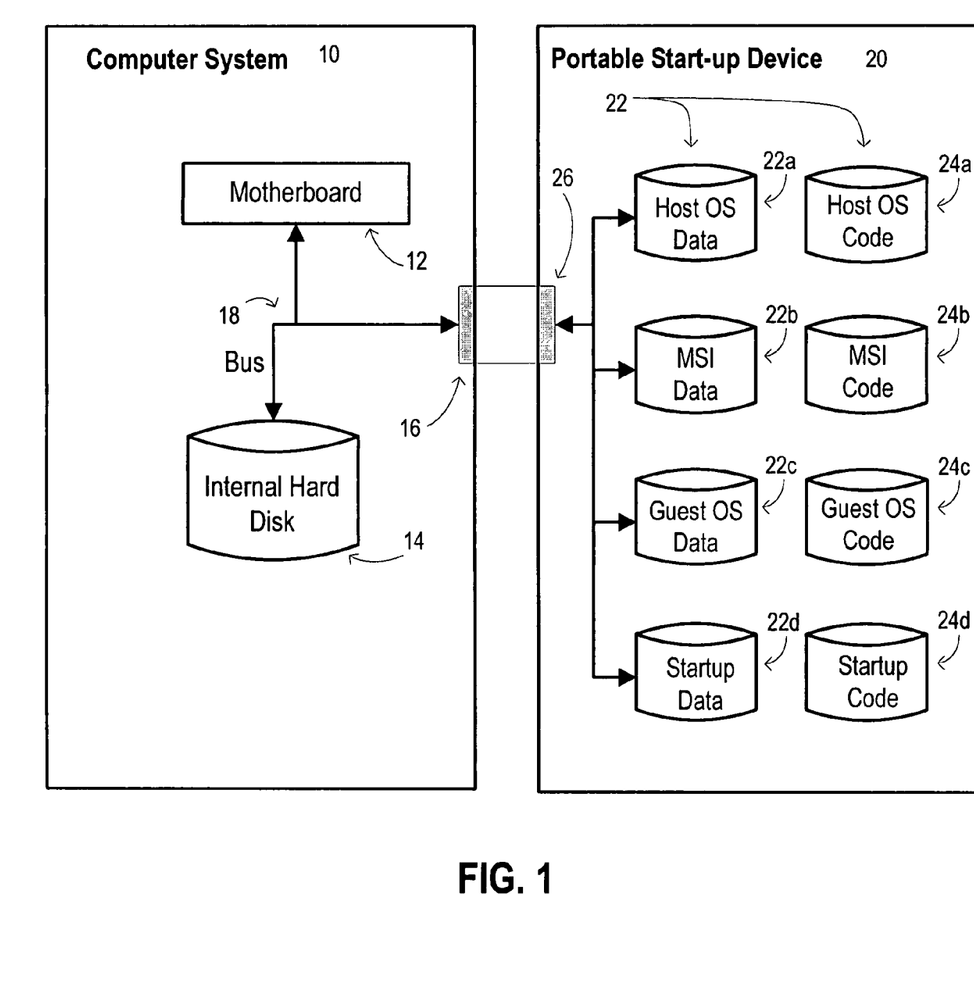
FIG. 1, FIG. 2, FIG. 3, and FIG. 5 respectively represent the general structure of illustrated embodiments of a computer system with an attached portable device according to the present invention, for the secure start-up of a computer system; and, FIG. 4 illustrates the successive steps of an embodiment of a method for starting up a computer system according to the invention.

In FIG. 1, a computer system is represented by the general reference 10. In particular, this system includes a motherboard 12, an internal hard disk 14, and a connection interface 16 to an external device. The three elements 12, 14, and 16 are interconnected using a bus 18 for standard data transmission. Also in a standard manner, the motherboard 12 typically includes a microprocessor, a ROM memory for storing the computer system's BIOS and RAM memory, in combination with the microprocessor, to execute programs, notably including a start-up program for the computer system 10. As an example, such a start-up program is stored by default on the computer system's internal hard disk 14.

Among the aforementioned hardware and/or software elements and comprising the computer system 10 some must be recognized by an operating system activated by the start-up program of the computer system 10 and are accessible through some computer drivers which are specifically associated to them: this involves, for example, the motherboard 12, ROM and RAM memories, the internal hard disk 14, the connection interface 16. The computer system 10, however, may comprise other elements that are accessible via associated drivers, such as for example a graphics card, a network card, and peripheral devices such as a CD-ROM drive, a mouse, a keyboard, a screen, speakers, etc.

This system is designed to implement the invention, but there are also other possible configurations suitable for computer systems. Indeed, the invention applies, in a non-limiting manner, to computer systems such as desktop and portable PCs, servers, multiprocessor systems, local computer networks, etc.

A portable start-up device 20, separate from the computer system 10, is also shown in FIG. 1.

It comprises data 22a and executable codes 24a of a first operating system, called the "host" operating system, selected for its ability to automatically detect hardware and/or software elements on the computer system 10 such as those items mentioned above and to be activated by the corresponding computer drivers. A start-up program must also be able to boot this host operating system on the external medium. As a non-limiting example, Mandriva Linux Spring Free 2007.1 (registered trademarks) meets these requirements.

It also comprises data 22b and executable codes 24b of a management software interface configured to present the computer drivers that are activated by the host operating system in the form of at least one predetermined generic computer driver capable of being recognized by any operating system. This management software interface is also able to activate an operating system. As a non-limiting example, the VirtualBox (registered trademark) software meets these requirements.

It also comprises data 22c and executable codes 24c of a second operating system, called the "guest" operating system, that can be activated by the management software interface and configured to manage the hardware and/or software elements of the computer system 10 using the predetermined generic computer driver. As stated in the previous paragraph, any type of operating system is suitable in principle, provided that it is supported by the management software interface.

Finally, optionally, it comprises data 22d and executable codes 24d for a start-up program of the computer system capable of activating the host operating system.

For the sake of clarity, the data and executable codes (reference 22a, 22b, 22c, 22d, 24a, 24b, 24c, 24d, collectively referenced as 22), are shown in FIG. 1 as being functionally stored on different media. Indeed, they can be physically stored on a single external hard disk or other data media, in one or more partitions.

Moreover, all of said data 22a, 22b, 22c, 22d and executable codes 24a, 24b, 24c, 24d can be stored in encrypted form with an associated signature, in accordance with standard cryptographic methods.

The portable external start-up device 20 also comprises a direct or indirect connection interface 26 to the computer system 10.

Figure 5:
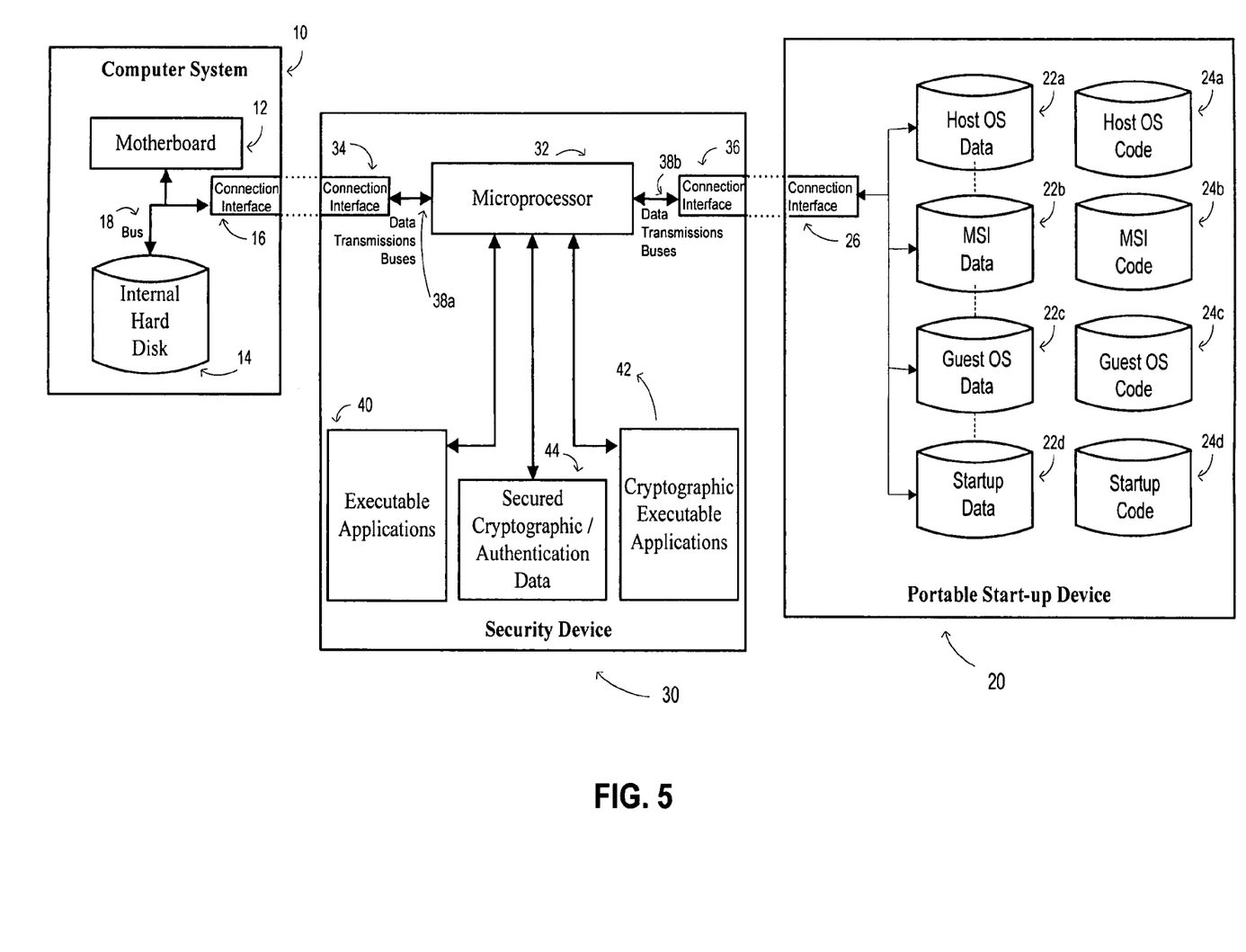

In the example of FIG. 5, the connection between the portable start-up device 20 and the computer system 10 is indirect. That is, the connection is by a security device 30 for starting up the computer system 10 is positioned in between. In practice, the portable external start-up device 20 is, for example, a USB type key or even an external hard disk with a USB connection, in which case the connection interface 26 is a port or a USB socket.

The optional security device 30 as shown in FIG. 5 is, for example, embodied as a system-on-chip, with security functionalities for using data and executable codes 22a, 22b, 22c, 22d, 24a, 24b, 24c, 24d, stored by the portable external start-up device 20, and data transmission functionalities. The security functionalities for using data and executable codes may include functionalities for verifying and validating a user's access rights as well as cryptographic functionalities for securing the data and codes themselves.

For this, it includes a microprocessor 32, two interfaces 34 and 36 connected to the microprocessor 32 by two data transmission buses 38a and 38b, means 40 for storing executable applications for sending and receiving data, means 42 for storing cryptographic and/or authentication executable applications for securing data and executable codes and for verifying and validating access rights, and means 44 for securely storing secret cryptographic and/or authentication data. The microprocessor 32, which has its own secure operating system, is configured for the following, in association with the means 40, 42, and 44:

executing a step for securing the use of data and executable codes of the portable external start-up device 20 comprising at least one of the following substeps:
verifying and validating access rights by user authentication, using means 42 and 44,
decrypting data and executable codes, if necessary, using means 42 and 44,
verifying signatures, if necessary, using means 42 and 44, managing data transfers between a first connection interface 34 to the computer system 10 and a second connection interface 36 to the portable external start-up device 20, using means 40 for transmitting data and executable codes 22a, 22b, 22c, 22d, 24a, 24b, 24c, 24d from the portable external start-up device 20 via the second connection interface 36 to the computer system 10 via the first connection interface 34, after executing the security step, by verifying and validating access rights, on the one hand, and cryptographically securing data and executable codes 22a, 22b, 22c, 22d, 24a, 24b, 24c, 24d, on the other, for starting up the computer system 10 using the transmitted data and executable codes, and suspending the start-up of the computer system 10 as long as the security step has not been executed.

Note that the microprocessor 32, associated with the means 40, 42, and 44, allows the security device 30 to operate autonomously to secure and transmit its data and executable codes. Specifically, it is completely independent of the resources of the computer system 10.

In the embodiment in FIG. 5, the computer system 10, the security device 30, and the portable external start-up device 20 represent three separate components that can easily be connected or disconnected via the interfaces 16, 34, 36, and 26. As mentioned above, interfaces 36 and 26 are, for example, USB-compatible type ports and/or sockets. The same may be true for interfaces 16 and 34. After connecting these three devices 10, 20, and 30, the security device 30 is positioned between the computer system 10 and the portable external start-up device 20, forming a functional or physical inline connection, to perform a secure start-up on the computer system 10. In this embodiment, the security device 30 can take the form of a VHDL block of an ASIC ("Application Specific Integrated Circuit") component or an independent FPGA ("Field Programmable Gate Array").

Figure 2:
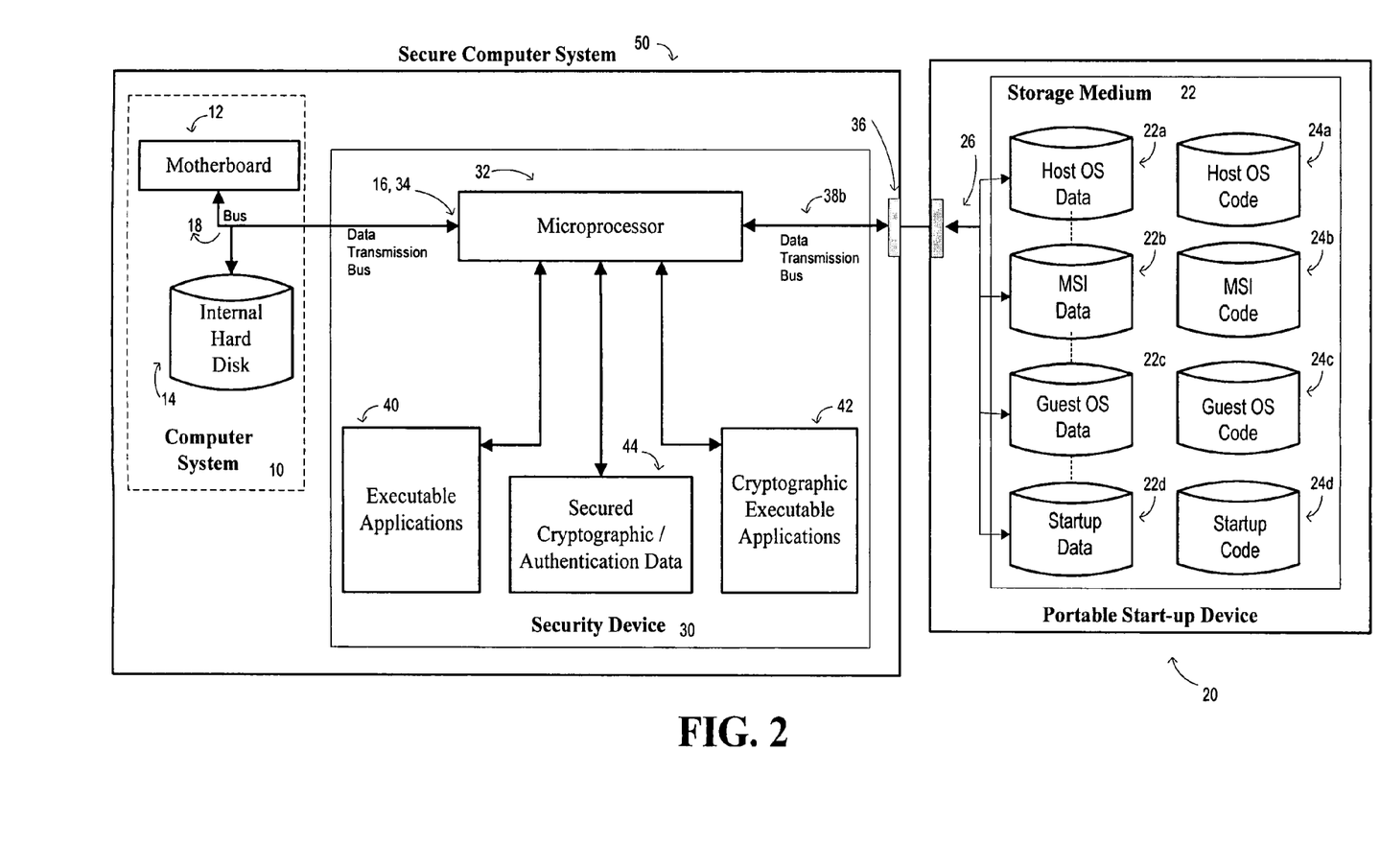

In another embodiment represented in FIG. 2, the security device 30 is integrated, with the computer system 10, into a secure computer system 50. In this embodiment, the security device 30 can take the form of a VHDL block from an ASIC component or an FPGA, functionally or physically positioned inline between the second connection interface 36 of the portable external start-up device 20 and the data transfer bus 18 of the computer system 10. The first connection interface 34 from the security device 30 to the computer system then forms an access point to the bus 18 of the microprocessor 32 of the security device 30.

Figure 3:
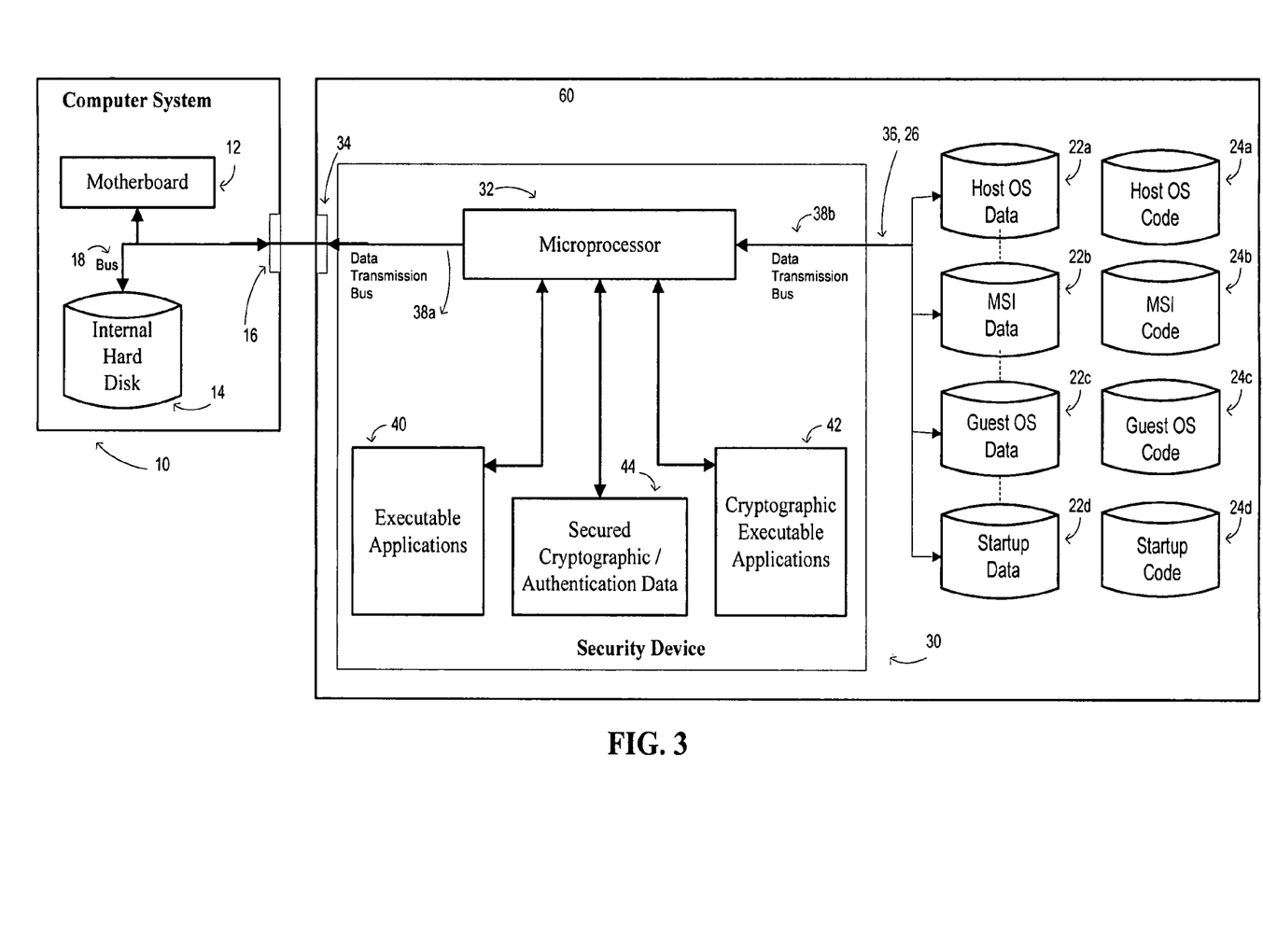

Finally, in another embodiment shown in FIG. 3, the security device 30 is integrated into a portable start-up device 60. In this embodiment, the storage medium of the data and executable codes 22a, 22b, 22c, 22d, 24a, 24b, 24c, 24d can be directly connected to the data transmission bus 38b of the security device 30, this device being able to take the form of a VHDL block of an ASIC component or an FPGA, functionally or physically positioned inline between the storage medium of the data and executable codes 22a, 22b, 22c, 22d, 24a, 24b, 24c, 24d and the first connection interface 34 of the security device 30 to the computer system. In this case, interfaces 16 and 34 can take the form of matching USB ports and/or sockets. Interface 34 then functions as a connection interface from the portable external start-up device 20 to the computer system 10. As for the interface 36, it takes the form of an access point to the bus 38b.

The security functionalities of the security device 30 include one or more of the standard cryptographic functions, particularly confidentiality, integrity, and authentication.

Confidentiality relates to the exchange of encrypted messages between entities, which are unintelligible without a decryption key. This confidentiality is maintained by the application of symmetric (i.e. secret key) or asymmetric (i.e., private-public key pair) encryption schema algorithms. To provide this functionality, the security device 30 must store the key(s) needed for encryption and decryption in the secure storage means 44 and the corresponding encryption algorithm(s) in the application storage means 42. This functionality applies to the data and executable codes 22a, 22b, 22c, 22d, 24a, 24b, 24c, 24d, possibly using different keys and algorithms.

The integrity relates to verifying that a received message has not been modified by a third party or a malicious system. This integrity is managed using secret key hash functions, called HMAC ("Keyed-Hash Message Authentication Code") functions, or by means of public key signature schemas. Likewise, to provide this functionality, the security device 30 stores the key(s) needed for verifying a signature in the secure storage means 44 and the corresponding signature generation and/or verification algorithm(s) in the application storage means 42. This functionality applies to the data and executable codes 22a, 22b, 22c, 22d, 24a, 24b, 24c, 24d, possibly using different keys and algorithms.

Authentication relates to identifying an individual using a secret that only that person possesses. The secret may be a code or password, but it can also include biometric data. There are several authentication protocols: some simply compare an entered secret against a securely stored model, others combine authentication with confidentiality or integrity, while others reveal no knowledge. To provide this functionality, the security device 30 eventually stores a model in the secure storage means 44 and the relevant authentication protocol in the application storage means 42. It must also include means to enter the secret, such as an alphanumeric keyboard or a biometric sensor (not shown in FIG. 1, FIG. 2 and FIG. 3). This functionality is intended, for example, for the owner of the portable external start-up device 20, as a user wishing to start up the computer system 10 by means of his own start-up program and associated data and executable codes 22a, 22b, 22c, 22d, 24a, 24b, 24c, 24d.

As illustrated in FIG. 1, FIG. 2, and FIG. 3, the application storage means 42, on the one hand, and the secure storage means 44, on the other, are presented as a possible architecture for implementing security functionalities for the use of the data and executable codes 22a, 22b, 22c, 22d, 24a, 24b, 24c, 24d, but other architectures are also possible: particularly the supply of more independent storage media and of different types, each suited to one or more functions from among the aforementioned cryptographic functions, possibly partitioned. In the case of FIG. 3, they can also be combined 60 with the storage medium for the data and executable codes 22a, 22b, 22c, 22d, 24a, 24b, 24c, 24d, in one or more partitions.

Furthermore, as the aforementioned functions implement algorithms based on cryptographic keys, algorithms for generating random numbers, generating cryptographic keys, maintaining generated key integrity, etc. can be included in the security device 30 and executed by the microprocessor 32 and the associated storage means.

Finally, interfaces 16, 26, 34, and 36 have been described, as an example, as being able to be of the USB type or having direct access to a data transmission bus. More generally, these interfaces can be of the parallel (processor bus, PCMCIA, etc.), serial (USB, PCI-X, etc.), or wireless (wireless USB, etc.) type.

Figure 4:
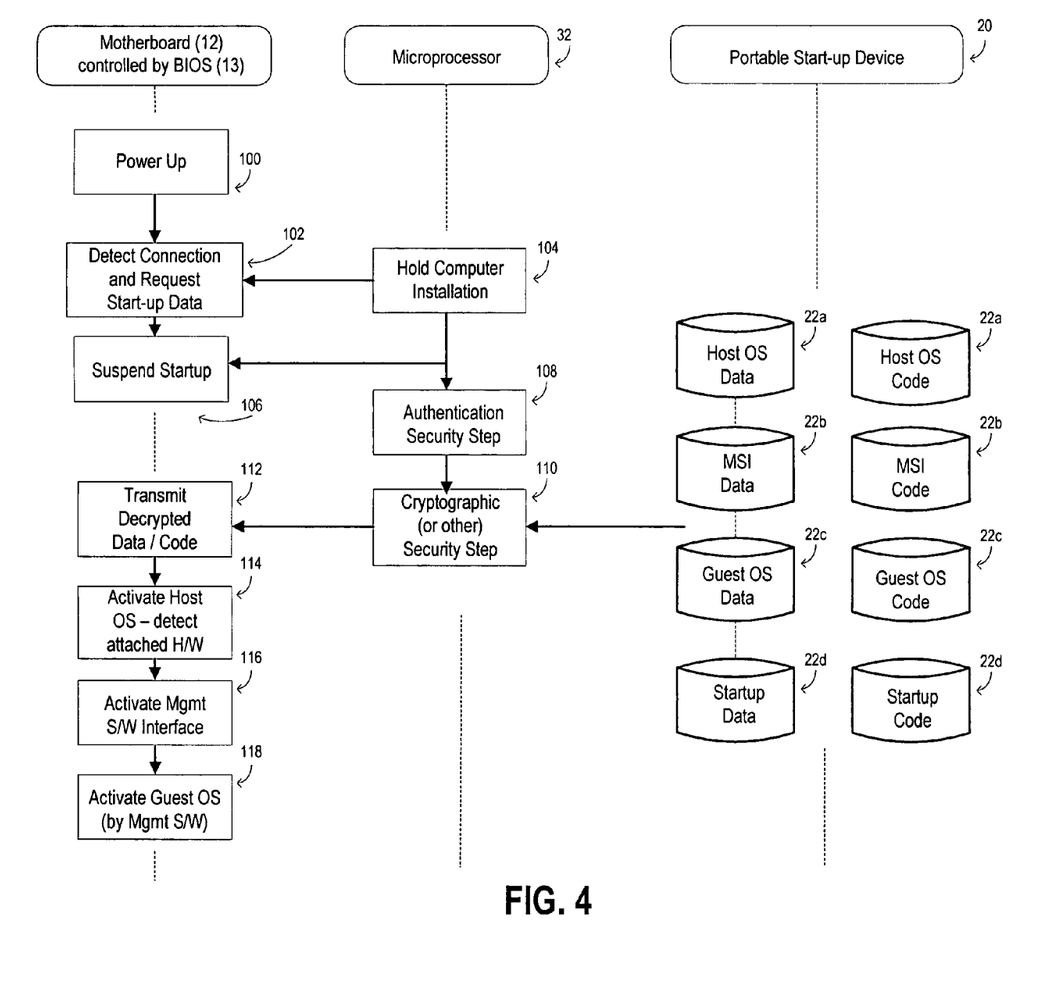

The implementation, by one of the previously described systems, of an embodiment of a start-up method of the computer system 10 according to the invention will now be addressed, in reference to FIG. 4.

This embodiment provides for the optional protection of the use of data and executable codes stored by the portable external start-up device 20 using the security device 30. However, it must be clearly noted that the presence of the security device 30 functionally or physically inline between the computer system 10 and the portable external start-up device 20 on the one hand and the security steps in the start-up method on the other hand are optional.

During a first step 100, the computer system 10 is powered up, which triggers the BIOS of the motherboard 13 to execute. Typically, the BIOS starts by testing, declaring, and configuring the various hardware and software elements associated with the computer system 10, then looks for a start-up program and an associated operating system before launching it, in accordance with a predefined start-up strategy.

In the next step 102, the BIOS of the motherboard 12 detects the connection of the security device 30 to the interface 16 of the computer system 10. During this step, it requests for data and executable codes to be transmitted from a start-up program to the security device 30.

Then, during a step 104, the microprocessor 32 of the security device 30 receives this request and generates a command to hold the start-up of the computer system 10 as long as at least the use of the data 22d and executable codes 24d of the start-up program stored on the portable external start-up device 20 have not been made secure, or even all of the data and executable codes 22a, 22b, 22c, 22d, 24a, 24b, 24c, 24d.

This step 104 is followed by a step 106 in which the microprocessor on the motherboard 12 suspends the start-up of the computer system 10.

Step 104 is also followed by an authentication step 108, constituting a first step securing the use of data and executable codes 22a, 22b, 22c, 22d, 24a, 24b, 24c, 24d so as to ensure that the user wishing to start up the computer system 10 actually has access rights to the data and executable codes stored by the portable external start-up device 20. This step requires the user to enter a secret (code, password, or biometric data) via a dedicated interface on the secure start-up device 30 or on the portable external start-up device 20, as in the case of FIG. 3.

Following step 108 is step 110, constituting a second security step of the use of data and executable codes 22a, 22b, 22c, 22d, 24a, 24b, 24c, 24d. During this step, the data and executable codes 2 stored on the portable external start-up device 20 are processed by the microprocessor 32, using cryptographic functions and data stored in the storage means 42 and 44, to be decrypted and/or validated in terms of integrity before being transmitted to the processor of the motherboard 12 of the computer system 10.

The transmission, by the security device 30, of the decrypted data and executable codes to the computer system 10 is only carried out if the steps 108 and 110 have been completed successfully. A function of the security device 30 is indeed to come between the computer system 10 and the portable external start-up device 20 in order to secure the use of data and executable codes and to send them (data and executable codes) to the computer system 10 only if the security device 30 has fully completed the security step, by verifying and validating the user's access rights, on the one hand, and cryptographically securing the data and executable codes, on the other hand.

When the access rights are validated, when the integrity of the data and executable codes is verified and they are decrypted, a final step 112 is reached for transmitting the decrypted data and executable codes to the computer system 10 and continuing to start up the computer system 10 based on the transmitted data and executable codes. This start-up is performed by the microprocessor on the motherboard 12.

The operation of the security device 30 has just been described in its current use, whereby a user starts up the computer system 10 based on the data and executable codes specific to this user and stored on the portable external start-up device 20 of this user.

The security device 30 can also be designed to have an "administrator" mode, as an alternative to the previously described "user" mode. An administrator is a special user having additional rights and who must therefore be identified using specific data.

In the administrator mode, it may be possible to define the size of the authentication data, the cryptographic mechanisms used, the number of partitions and attributes of the storage means, the various user authorizations, the authentication protocol used, the right of a user to modify the configuration of the partitions, etc.

For the rest of the description, it is considered that all the data and all the executable codes 22a, 22b, 22c, 22d, 24a, 24b, 24c, 24d of the start-up programs, host operating system, management software interface, and guest operating system were transmitted during step 112. This is a simple choice of embodiment. Indeed, as a variant, the data and executable codes of the start-up program, those of the host operating system, those of the management software interface, and those of the guest operating system can be transmitted in several steps, as needed for the computer system 10.

During step 112, once the data and executable codes have been received, the computer system 10 executes the start-up program.

Next, during step 114, the host operating system is activated by this start-up program. It automatically detects the hardware and/or software elements on the computer system 10, identifies the relevant computer drivers among the data 22a, and activates said drivers. Moreover, the host operating system can be configured not to allow the internal hard disk of the computer system 10 to be read.

During a next step 116, the host operating system activates the management software interface, so as to establish correspondence between the activated computer drivers and corresponding to the hardware and/or software elements of the computer system 10, on the one hand, and at least one predetermined generic computer driver that is recognized by all operating systems, on the other.

Finally, during a step 118, the guest operating system is activated by the management software interface. This management software interface fulfils a virtualization function between the host operating system and the guest operating system. The host operating system makes it possible to automatically recognize the hardware and/or software elements of the start-up computer system 10, but it is the guest operating system that allows the user to recover his usual work environment.

It clearly appears that the previously described start-up portable device or method enables a totally customized start-up for a computer system 10, after a possible protection of a use of data and executable codes carried out independently from the resources of the computer system. It is sufficient for the BIOS of this computer system to give priority to a start-up based on the data and executable codes stored in an external device, which is generally the case for any correctly configured BIOS.

The security device 30 is then responsible for the validating and verifying steps of the access rights, then the step of verifying the integrity and transmitting the decrypted data and executable codes.

The portable external start-up device 20 is responsible for transmitting the necessary data and executable codes for the automatic start-up of the computer system 10 under an operating system and environment specific to the user.

Hence, a user can supply their own portable external start-up device and start up any computer system with their data set, while having the assurance of a simple start up and possibly the security of integrity and confidentiality in the use these executable codes and data.

Finally, note that the invention is not limited to the previously described embodiments.

In fact, variations can be made to the structure of the implemented computer system, whether it is at the level of the computer system, the security device, or the portable external start-up device.

Variations can also be made to the implemented method. For example, it is unnecessary for the data and executable code of the start-up program, the host operating system, and the management software interface to be stored on the portable external start-up device to implement a start-up method according to the invention. Only the data and executable codes of the guest operating system comprise data specific to the user and must be stored on the portable external start-up device. In this case, the start-up program, the host operating system, and the management software interface can reside on the computer system 10 itself: when it is executed, the management software interface requires the data and executable codes of the guest operating system to be transferred from the portable external start-up device. However, in practice, it is preferable for the host operating system and the management software interface to be stored on a same medium.

Having now described the preferred embodiments of the invention, it will become apparent to one of skill in the arts that other embodiments incorporating the concepts may be used. It is felt, therefore, that these embodiments should not be limited to the disclosed embodiments but rather should be limited only by the spirit and scope of the following claims.

I claim:

1. A portable start-up device for connection to and starting up of a computer system, the portable start-up device comprising:
   A) a connection interface for connecting the portable start-up device to the computer system;
   B) a storage medium internal to the portable start-up device, the storage medium containing:
      1) first storage space which contains data and executable code of an underlying host operating system that can be initially activated by a start-up program of the computer system; and,
         the underlying host operating system being capable and configured to provide automatic detection of one or more hardware elements of the computer system and for activating driver programs specified for use with the detected hardware elements;
      2) second storage space for storing of data and executable code of a guest operating system which a user of the portable start-up device may desire to utilize for booting of the computer system;
      3) third storage space which contains data and executable code of a management software interface, the management software interface being operative to:
         a) present the driver programs activated by the underlying host operating system in the form of one or more predetermined generic driver programs; and,
         b) activate the guest operating system, in a manner so as to make available for use by the guest operating system one or more of the predetermined generic driver programs.

2. The portable start-up device for connection to and starting up of a computer system according to claim 1, wherein the storage medium further includes storage space containing fourth data and executable code of the start-up program of the computer system.

3. The portable start-up device for connection to and starting up of a computer system according to claim 1, wherein the connection interface is a USB (Universal Serial Bus) port.

4. The portable device for connection to and starting up of a computer system according to claim 1, further comprising means for securing use of any one or more of the data and executable code stored in the storage spaces of the storage medium and means for transmitting the data and executable codes from the storage medium to the computer system via the connection interface, after performing a security operation using the means for securing on the data and executable codes.

5. The portable device for connection to and starting up of a computer system according to claim 4, wherein the security means comprise means for validating and verifying access rights by executing an authentication operation performed by the user of the portable device.

6. The portable start-up device for connection to and starting up of a computer system according to claim 4, wherein the security means comprise cryptographic security means for securing any of the data and executable codes contained in the storage space of the storage medium.

7. The portable start-up device for connection to and starting up of a computer system according to claim 6, wherein the cryptographic security means further comprise means for executing an operation for verifying integrity of any of the data and executable code contained by the storage medium.

8. The portable start-up device for connection to and starting up of a computer system according to claim 6, wherein the cryptographic security means comprise means for executing a method for decrypting any of the data and executable code stored on the data medium.

9. A method for starting up a computer system using a portable external start-up device which includes a storage medium, comprising the following steps:
- connecting the portable external start-up device to the computer system;
- executing a start-up program of the computer system, contained by the storage medium;
- activating by the start-up program of the computer system a first operating system contained on the storage medium, the first operating system to automatically detect hardware and/or software elements of the computer system and to activate corresponding computer drivers;
- activating a management software interface configured to present the computer drivers that are activated by the first operating system in the form of at least one predetermined generic computer driver; and,
- activating by the management software interface, of a second operating system, contained on the storage medium, data and executable codes for managing hardware and/or software elements of the computer system using the predetermined generic computer driver.

10. The method for starting up a computer system according to claim 9, further comprising a security step for securing use of any of the data and executable codes stored on the data medium of the portable external start-up device and, after the security step has been executed, a transmission step by the portable external start-up device, of the data and executable codes to the computer system, for use in the activating of the second operating system.

* * * * *